Figure 1:
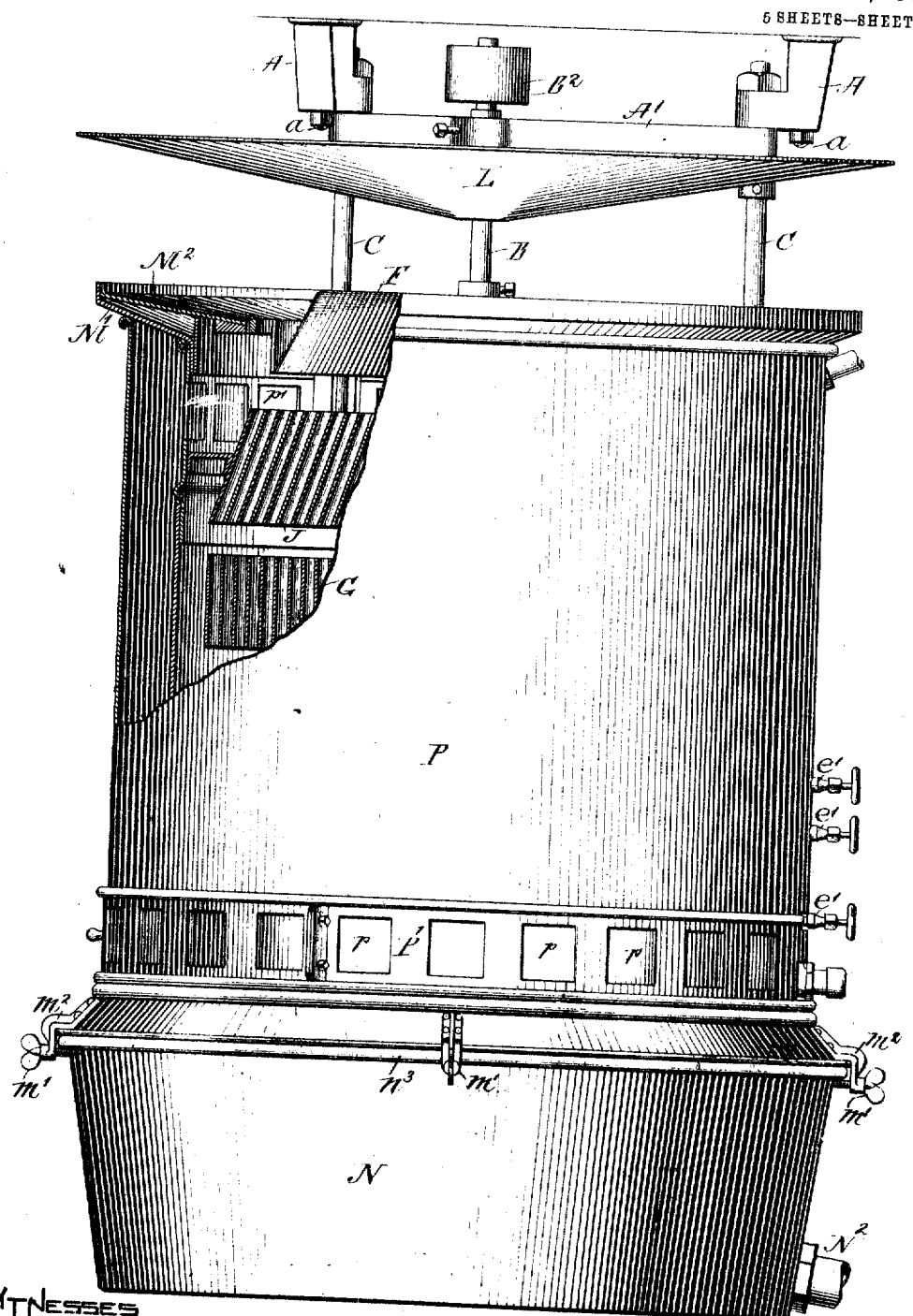

D. P. GOSLINE.
MACHINE FOR HUMIDIFYING AND CLEANSING AIR AND CONTROLLING ITS TEMPERATURE.
APPLICATION FILED APR. 7, 1906.

916,146.

Patented Mar. 23, 1909.
5 SHEETS—SHEET 1.

D. P. GOSLINE.
MACHINE FOR HUMIDIFYING AND CLEANSING AIR AND CONTROLLING ITS TEMPERATURE.
APPLICATION FILED APR. 7, 1906.

916,146.

Patented Mar. 23, 1909.
5 SHEETS—SHEET 4.

WITNESSES

INVENTOR

D. P. GOSLINE.
MACHINE FOR HUMIDIFYING AND CLEANSING AIR AND CONTROLLING ITS TEMPERATURE.
APPLICATION FILED APR. 7, 1906.

916,146.

Patented Mar. 23, 1909
5 SHEETS—SHEET 5.

UNITED STATES PATENT OFFICE.

DANIEL P. GOSLINE, OF BOSTON, MASSACHUSETTS.

MACHINE FOR HUMIDIFYING AND CLEANSING AIR AND CONTROLLING ITS TEMPERATURE.

No. 916,146.  Specification of Letters Patent.  Patented March 23, 1909.

Application filed April 7, 1906. Serial No. 310,426.

*To all whom it may concern:*

Be it known that I, DANIEL P. GOSLINE, of Boston, in the county of Suffolk and State of Massachusetts, a subject of Edward VII, King of Great Britain, have invented a new and useful Improvement in Machines for Humidifying and Cleansing Air and Controlling its Temperature, of which the following is a specification.

My invention consists in means for utilizing certain new principles for conditioning air; and by conditioning I mean so changing its condition either by moistening, drying or cleansing it or changing its temperature that it becomes more useful for the purpose for which it is intended.

The machine best adapted as I now believe for carrying out my new principles is one which forms the subject matter of this application for Letters Patent and will be hereinafter described. Its peculiar features are mainly the use of revolving evaporative surfaces in connection with extended broken or plane surfaces, all of which being continually moistened by water supplied at such temperatures as shall best produce the result sought, over which surfaces the air is drawn by a fan of suitable construction, the apparatus also preferably being supplied with means whereby a certain amount of atmospheric air can be drawn into the apparatus in order to, as it were, change or control somewhat the product of the machine.

There are now on the market certain machines which seek to warm, to cool, or otherwise condition air, some by the use of an atomizing spray ejected into the atmosphere of the room, others by the use of air circulated in ducts in close contact with falling water distributed over stationary surfaces, others by the use of moistened burlaps or felts so arranged as to provide air ducts or passages through which the air is forced. My invention discards all these methods as highly inefficient and incapable of doing the work for which they are intended. They are also unsanitary and, as a rule, extremely inconvenient to reach for purposes of repair, being usually so constructed that they must be entirely taken apart in order to correct some simple difficulty.

My invention, as will be seen, is comparatively simple in structure and one strong feature is its construction which is simple, its casing and frame being independent and so arranged that a portion of the casing may be removed in order to get at the interior and make any necessary repairs or alterations.

I do not mean to confine my invention to the exact construction shown, but as shown and hereinafter described, an embodiment of my invention will be understood by reference to the drawings, in which—

Figure 2:
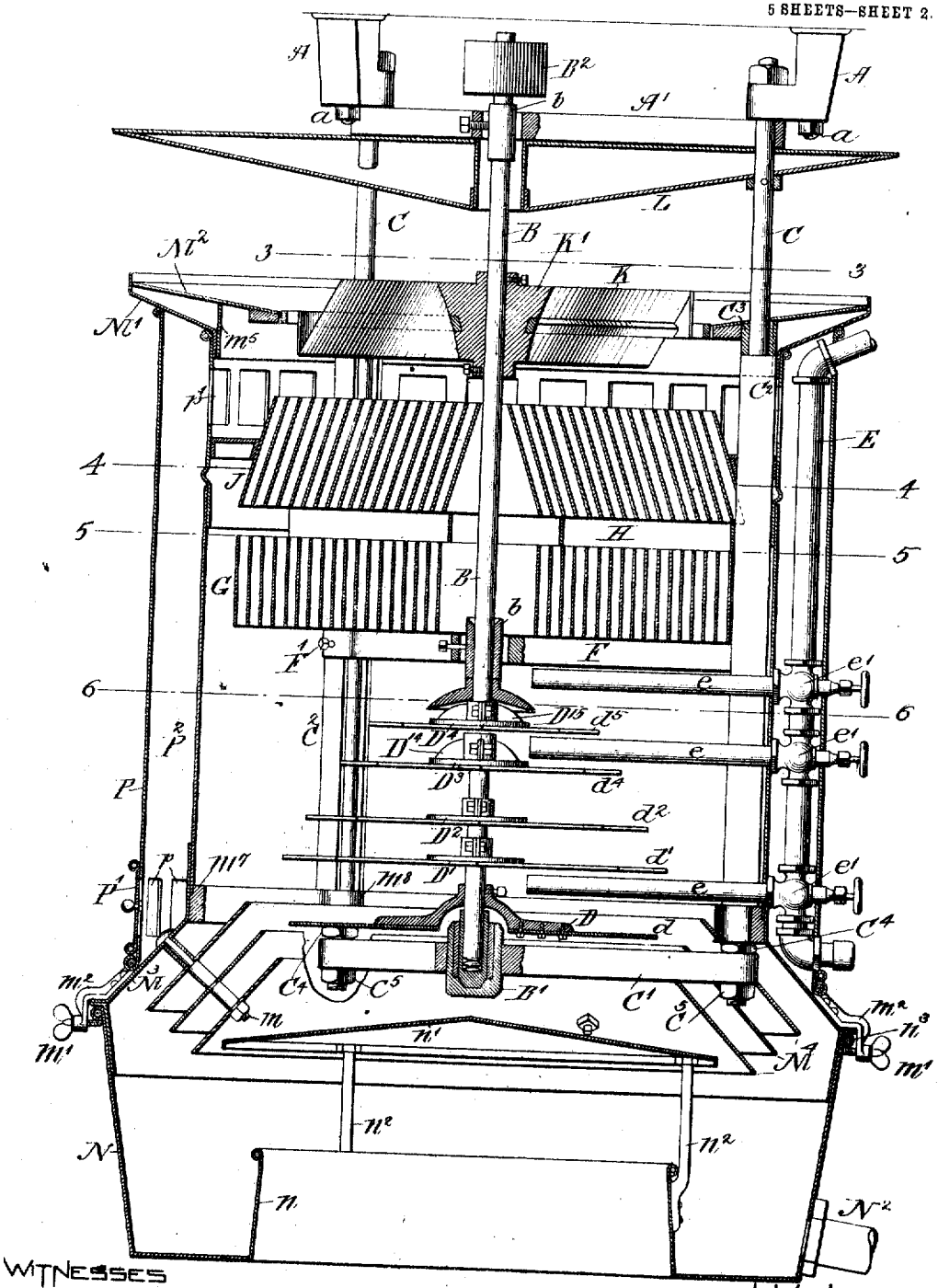
Figure 3:
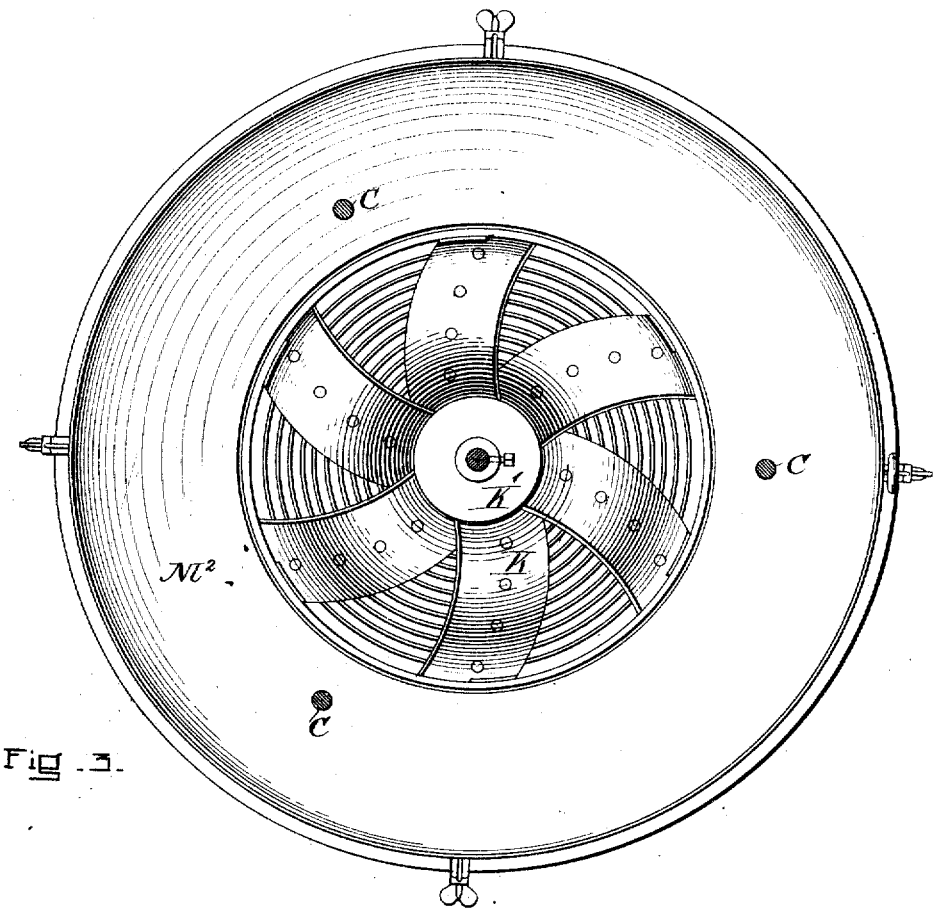
Figure 4:
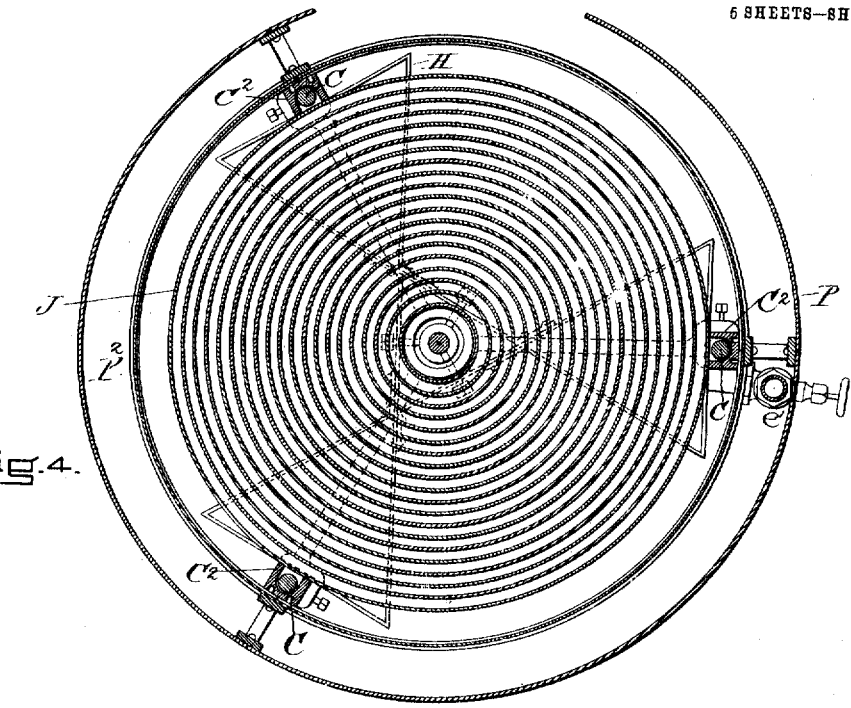
Figure 6:
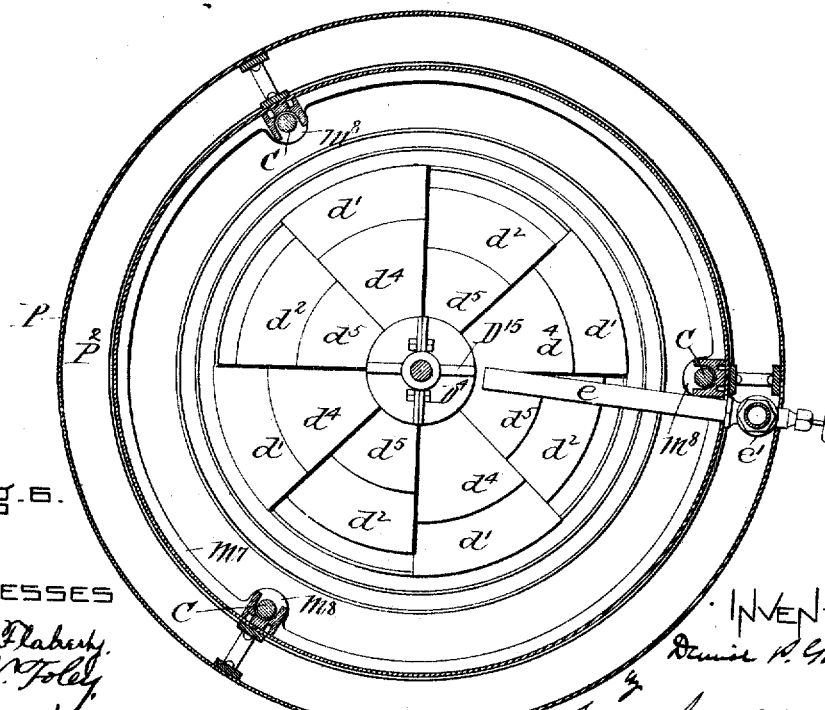
Figure 5:
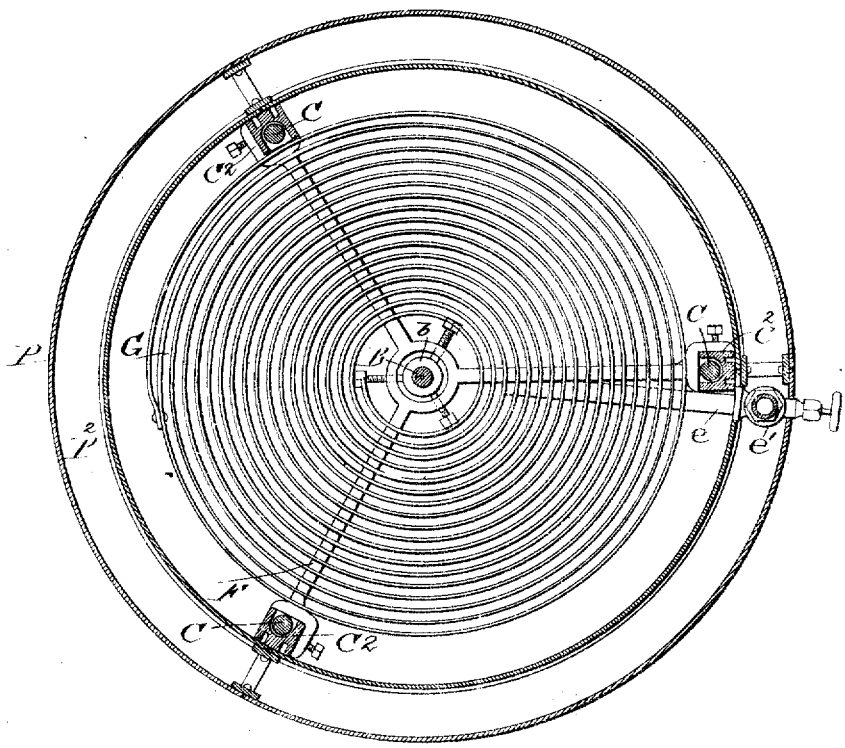

Figure 1 is an elevation of a machine embodying my invention, the outer and inner jackets being broken away to show a portion of the interior construction. Fig. 2 is a vertical section. Figs. 3, 4, 5 and 6 are horizontal sections on lines 3—3, 4—4, 5—5 and 6—6, respectively, of Fig. 2.

My machine as shown is built up on a frame comprising principally a series of rods or bolts, three in number as shown, marked C which are connected together at the top by a spider $A^1$ hung from hangers A attached to the ceiling by suitable bolts $a$. At their lower ends these rods pass through lugs formed upon a ring $m^7$ (see Fig. 3), these lugs being marked $m^8$, and also through holes in the top ring or casting $C^3$. These rings are held at a proper distance apart by channel bars $C^2$ of which one partially surrounds each rod. Each rod is provided near its lower end with a nut $C^4$ by which its channel bar is held in place and below the nut is carried a spider $C^1$ through the arms of which the bolts or rods C pass and which is attached to said bolts by means of nuts $C^5$. Another spider F is attached to the channel bars by suitable set screws $F^1$ about midway between the rings $C^1$ and $m^7$. This construction, together with the spider $A^1$, forms a rigid frame to which the other parts are secured. The three spiders $A^1$, F and $C^1$ are each provided with a central opening in which are provided suitable bearings $b$ for the shaft B, this shaft being supported in a step $B^1$ located in the lower spider $C^1$. The shaft is also provided with water breakers $D^{14}$, $D^{15}$ which consist of ribs attached to a clamp which clamps about the shaft. Sectional disks $D^1$, $D^2$, $D^3$, $D^4$ are also clamped about the shaft and are provided with projecting sections $d^1$, $d^2$, $d^4$, $d^5$. Another disk $d$, similar in character is located near the bottom of the shaft and is attached thereto by means of a clamp D which also comprises ribs forming water breakers similar to the water breakers $D^{14}$, $D^{15}$. Thus there are provided five segmental or sectional disks and three water breakers in the form of my improvement shown in the drawings. The sections attached to these disks are arranged to break joints and their purpose is to break up the air and more especially to receive streams of water fed to them and by their rapid rotation to allow the evaporation of the water therefrom and also to throw the water into the farther parts of the apparatus, these forming air moistening surfaces. The air current is drawn up through the apparatus or driven down through it by means of a fan K attached to a hub K¹ also clamped to the shaft B. Any fan can be used for this purpose, but I prefer to use the form of fan described in an application for Letters Patent recently filed by me in the United States Patent Office, Serial No. 275,650.

The spider F supports two sets of air deflectors G and J, the set J resting upon the spider H, which in turn rests upon the deflectors G. I prefer that the lower deflectors form a set of vertical passages for the air and the upper deflectors a set of passages inclined with respect to the shaft as will be seen from Fig. 2. I also provide a set of deflectors M⁴ near the bottom of the apparatus which are held in place by bolts $m$ attached to a portion of the inner casing, which is now to be described. This inner casing is made preferably of three sections, its edges being joined to the channel irons C² in any convenient way, preferably in such a way that in case it is necessary to make an examination of the interior of the apparatus one of these sections can be removed without removing any of the others. The upper end of the casing carries a spreading flange M¹ and on this flange rests the cover M² of the apparatus which is provided with an opening sufficiently large to receive the fan K and from which depends a band $m^5$ forming an air chamber which prevents condensation. As shown, the upper portion of this casing is made separate from the lower portion and sets into the cylinder formed by the several sections forming the part of the casing and rests upon the extended ring M⁷. To the lower end of the casing is attached an outwardly projecting flange M³ from which the conical deflectors M⁴ are supported by the bolts $m$ as above described. From this outwardly projecting flange also depends a drip-pan N. The drip-pan is provided with a central opening surrounded by an upwardly projecting flange $n$ over which is supported a deflector $n^1$ upon arms $n^2$ attached to the periphery of the flange $n$. The opening surrounded by the flange $n$ is for the purpose of allowing the inflow of air, and the drip-pan N is for the purpose of catching any water which may be in excess of that needed to change the condition of the air.

N² is a drip-pipe for draining the drip-pan. I prefer to attach the drip-pan to the flange M³ of the casing by thumb screws $m^4$ which pass through fingers $m^2$ to engage the under edge of the rim $n^3$ which rim forms the upper edge of the drip-pan.

To supply moisture to the various moisteners I provide a pipe E which has a number of branches $e$. Three are shown in the drawings and each branch is open at its end and located over one of the moistening surfaces and in front of one of the breakers. The passage of water to each branch is controlled by a valve $e^1$, this valve being so constructed that although it passes through the pipe E it will not interfere with the passage of water through said pipe. The water coming from one or more of these branches falls on the rapidly rotating breakers and is mechanically atomized, the ribs breaking up the stream and throwing the water upon the other rotating parts. The air being drawn either up or down through the apparatus a portion of the moisture is evaporated from the surface of the disks and their sectional projections, being broken up by the breakers where necessary, and thrown throughout the entire chamber within the casing.

As a means of controlling the condition of the air, which may to a certain extent be accomplished by controlling the amount of water falling from the branches $e$, I provide a jacket P for the body of the apparatus which is provided with openings $p$ controlled by a slide P¹, so that the amount of air which tends to pass into the chamber P² within the jacket may be controlled. At the upper end of this chamber I provide, also, one or more openings $p'$ connecting the chamber P² with the interior of the apparatus, so that the air which comes in through the openings $p$ may pass upward and into the humidifier and, because of its normal condition, may be utilized to dilute, as it were, or change the condition of the air which is passing through the humidifier and before it leaves it. In other words, it serves as another means of adjusting the character of the air which the apparatus will deliver.

The operation of this apparatus is as follows:—Its purpose in a given case being to lower the temperature and moisten the air in a given room, the fan K is started up by applying power to the shaft B by means of the pulley B². One of the branches $e$ from the pipe E is opened so as to allow a fine stream of water to fall upon the lowest moistening surface D. This surface it will be understood is being rotated rapidly with the other parts attached to the shaft, and the fan being rotated in the proper direction will draw the air through and out of the apparatus. The air passes in at the opening within the flange $n$ of the drip-pan and up, circulating as indicated by the arrows and causing the evaporation of the moisture from the moistening surfaces D, d, so as to lower the temperature of the air, and it passes on up through the various parts of the apparatus, being thoroughly deflected, and air of all conditions is thoroughly intermingled before it reaches the fan K and is thrown out into the room. If it is found that sufficient moisture is not being absorbed by the air, or that sufficient evaporation does not take place to cool the air, the valve e' controlling another branch pipe e is opened, thus allowing other of the moistening surfaces D', d', D², d², etc., to be wet down and giving the air the opportunity of causing more evaporation and absorbing more moisture. If it is found that, while the air which is furnished is sufficiently cool, yet is too moist, this situation may be controlled by opening the slide P¹ and allowing an inlet of air from the room through the openings p into the chamber or supplemental duct P² and the openings p¹ into the interior of the apparatus, the amount of air being controlled by the position of the slide P¹ with relation to its openings p. Thus it will be seen that a variety of combinations, suitable to any situation, can be controlled by the various adjustments of this apparatus. The temperature of the water has some bearing upon its absorption by the air and for the best results I prefer that this temperature shall be from 100 to 120 degrees, but any temperature may be used to meet the conditions and secure the desired results. The higher the temperature of a given quantity of water the more easily evaporation takes place, so that a given amount of water at a higher temperature will serve the same purpose as a larger amount of water at a lower temperature.

If instead of humidifying the room it is desired to use the apparatus for the purpose of cooling and drying, the operation of the apparatus is reversed, the hot air being taken from the ceiling of the room and delivered from the bottom of the apparatus, in this case it being preferable to use water at a very much lower temperature to draw down the temperature of the air. In any event the drip-pan serves to catch any moisture which is not taken up by the air and the moisture collected may be withdrawn from the drip-pan by the waste pipe N².

It will be seen that this device is in fact a main inclosure which having openings at the bottom and top serves as an air passage into which moisture is introduced in such a manner that it is scattered over rotating surfaces and about the interior of the casing by centrifugal force, the apparatus being preferably operated to take in air from the bottom and discharge it at the top near the ceiling of the room so that it may be diffused throughout the room without causing any appreciable draft. Around this main casing is a supplemental casing forming an inlet through which atmospheric air may be admitted under suitable control to be mingled with the moistened air which has passed through the apparatus, utilizing its moisture to a certain extent if it is considered desirable so to do.

What I claim as my invention is:

1. In an air-conditioning apparatus, an inclosed casing with openings therein forming a passage for air, a series of moistening surfaces located one above the other, means for dampening each of such moistening surfaces independently of the others, and means for rotating said surfaces, said surfaces being located in said passage, and a fan located at one end of the passage with one or more deflectors located at the other end, as described.

2. In an air-conditioning apparatus, an inclosed casing with openings therein forming a passage for air, a series of moistening surfaces located one above the other and means for rotating them, a series of means for dampening said moistening surfaces whereby liquid may be delivered at will upon one or more of them, as described.

3. In an air-conditioning apparatus, an inclosed casing with openings therein forming a passage for air, a series of moistening surfaces located in said passage and means for moistening them, an air deflector located at one end of said passage to direct the air upon said moistening surfaces and a fan located at the other end of said passage whereby air will be drawn through said deflectors against said moistening surfaces and the moistening of the air be insured.

4. In an air-conditioning apparatus, an inclosed casing with openings therein forming a passage for air, a shaft carrying a series of moistening surfaces each in a plane at right angles to the axis of said shaft, water-breakers located on said shaft, means for rotating said shaft and means independent of said rotating means whereby water is fed to said moistening surfaces and water-breakers, as described.

5. In an air conditioning apparatus, an inclosed casing with openings therein forming a passage for air, a shaft carrying a moistening surface located in a plane at right angles to the axis of said shaft, water-breakers located on said shaft, means for wetting said moistening surface and means for rotating said shaft independent of the means for wetting said moistening surface, and water-breakers whereby the water supply may be controlled without affecting the speed of rotating of said moistening surface.

6. In an air-conditioning apparatus, an inclosed casing with openings at each end thereof forming a passage for air, means for drawing air through said passage located at one end thereof, one or more moistening surfaces adapted to be rotated, means for wetting said moistening surface or surfaces, means independent of said wetting means for rotating said moistening surface or surfaces whereby the water supply may be controlled without affecting the speed of rotation of said moistening surfaces, and means for deflecting the incoming air against said moistening surface or surfaces located at the opposite end of said passage from said air-drawing means, as described.

7. In an air conditioning apparatus, an inclosed casing with openings therein forming a passage for air, a series of moistening surfaces made in sections and breaking joints with each other, and means for rotating said moistening surfaces, as described.

8. In an air conditioning apparatus, an inclosed casing with openings therein forming a passage for air, a moistening surface located therein, means for moving air through said passage and about the said surface, and means for directing air thereto, both located in said passage, said air-moving means and said air-directing means being located one on the one side of said moistening surface and the other on the other side thereof, and means for supplying a variable quantity of moisture to said moistening surface adjustable with relation to the air-moving means as described.

9. In an air conditioning apparatus, an inclosed casing with openings therein forming a passage for air, air moistening surfaces located within said passage, and means for directing air thereto comprising a series of deflectors, located at the air inlet of said passage, means such as a fan located at the outlet of said passage, and a series of cylindrical passages located within said passage between said air-moistening surfaces and the said air outlet.

10. In an air conditioning apparatus, an inclosed casing with openings at each end thereof forming a passage for air, a shaft, a series of moistening surfaces carried by said shaft each lying in a plane at right angles to the axis of said shaft, means for directing air to said moistening surfaces comprising one or more deflectors located at the air inlet to deflect air passing therethrough to said moistening surfaces, means independent thereof to direct water upon said moistening surfaces, and a series of surfaces located on the other side of said air-moistening surfaces from said deflectors whereby the air passing from said moistening surfaces is broken and intermingled.

11. In an air conditioning apparatus, an inclosed casing with openings therein forming a passage for air, means for partially closing it at its lower end comprising a drip-pan having a central opening therethrough, forming an air connection between the said passage and the outer atmosphere, a deflector located over said central opening adapted to deflect the air as it enters therethrough and to prevent the escape of falling moisture therethrough, air-moistening surfaces, and means for moving air through said air passage and against said air moistening surfaces, said drip-pan serving to collect any surplus of moisture falling from said moistening surfaces, as described.

12. In an air conditioning apparatus, an inclosed casing with openings therein forming a passage for air, air moistening surfaces located therein, means for rotating them, a rotary fan and a series of surfaces between said moistening surfaces and said fan adapted to interrupt the flow of air and cause the diffusion thereof in its passage to the fan, as described.

13. An air conditioning apparatus having an inclosed casing with openings therein forming a passage for air, one or more moistening surfaces located therein and adapted to be surrounded by the air, a fan located to move air through said air passage, and means such as a series of openings in the casing and a supplementary air duct connecting with the outer air whereby unmoistened air may be drawn from the atmosphere directly thro gh the fan and mingled with moistened as described.

14. In an air conditioning apparatus, an inclosed casing with openings therein forming a passage for air, a moistening surface located within said passage, a fan adapted to move the air through said passage, and adjustable means for introducing atmospheric air within said air passage to be mingled therein with said moistened air comprising a series of openings in said casing and means for wholly or partially closing them, whereby an adjustable quantity of atmospheric air is mixed with said moistened air as described.

15. The air conditioning apparatus above described comprising a frame consisting of a number of parallel vertical rods, a series of spiders located therein, deflectors supported by said spiders, a shaft supported by one of said spiders, a fan carried by said shaft, a series of rotary moisteners carried by said shaft, and a casing comprising a series of sections each attached to said vertical rods and separately separable therefrom, as described.

16. In an air conditioning machine, a series of rotary moisteners carrying ribs, and one or more pipes located to deliver water thereon, whereby the said ribs will cause the breaking up of the water and its distribution upon the other portions of the moisteners, as described.

17. In an air conditioning apparatus, a casing having an opening at each end forming a passage for air, means for changing the condition of the air as it passes therethrough and an outer casing surrounding said first-named casing and forming a chamber between it and said first-named casing, an inlet from the atmosphere into said chamber and an outlet from said chamber into said air passage, as set forth.

18. In an air conditioning apparatus, a casing having an opening at each end forming a passage for air, means for changing the condition of the air as it passes therethrough and an outer casing surrounding said first-named casing and forming a chamber between it and said first-named casing, an inlet into said chamber and an outlet from said chamber into said passage, said outer casing being provided with means whereby the size of the inlet of the said chamber may be controlled, as set forth.

19. In an air conditioning apparatus, a casing having an opening at each end forming a passage for air, a fan located in said passage and adapted to draw air therethrough, means for changing the condition of air as it passes therethrough and an outer casing surrounding said first-named casing and forming a chamber between it and said first-named casing, an inlet into said chamber and an outlet from said chamber into said air passage, as set forth.

20. In an air conditioning apparatus, a casing having an opening at each end forming a passage for air, a fan located in said passage and adapted to draw air therethrough, means for changing the condition of the air as it passes therethrough and an outer casing surrounding said first-named casing and forming a chamber between it and said first-named casing, an inlet into said chamber and an outlet from said chamber into said passage, said outer casing being provided with means whereby the size of the inlet of the said chamber may be controlled, as set forth.

DANIEL P. GOSLINE.

In presence of—
M. E. FLAHERTY,
DAN. O. G. ORNES.